United States Patent [19]

Beltz et al.

[11] Patent Number: 4,762,692

[45] Date of Patent: Aug. 9, 1988

[54] PROCESS FOR THE PRECIPITATION AND SEPARATION OF CADMIUM SULPHIDE FROM THE RAFFINATES DERIVED FROM PHOSPHORIC ACID PURIFICATION

[75] Inventors: Klaus Beltz, Budenheim; Klaus Frankenfeld, Hünfelden; Peter Ruschke, Budenheim; Gerhard Eich, Ingelheim, all of Fed. Rep. of Germany

[73] Assignee: Chemische Fabrik Budenheim Rudolf A. Oetker, Budenheim, Fed. Rep. of Germany

[21] Appl. No.: 13,885

[22] Filed: Feb. 12, 1987

[30] Foreign Application Priority Data

Jul. 4, 1986 [DE] Fed. Rep. of Germany ....... 3622597

[51] Int. Cl.$^4$ .................... C01B 25/234; C01B 25/46; C01G 11/02
[52] U.S. Cl. ............................ 423/321 R; 423/321 S; 423/101; 210/702
[58] Field of Search ................ 423/321 R, 321 S, 101, 423/112, DIG. 14, 122; 75/101 BE, 108, 121; 210/702

[56] References Cited

U.S. PATENT DOCUMENTS

| 1,538,089 | 5/1925 | Carothers et al. ............. 423/321 R |
| 1,857,470 | 5/1932 | Milligan et al. ............... 423/321 S |
| 4,378,340 | 3/1983 | Berglund ........................... 423/321 |
| 4,394,361 | 7/1983 | Berkowitz et al. ............. 423/321 S |
| 4,405,570 | 9/1983 | Van der Meulen et al. ....... 423/101 |
| 4,479,924 | 10/1984 | Van Plessen et al. ........... 423/321 S |
| 4,492,680 | 1/1985 | Frankenfeld et al. ............. 423/321 |
| 4,503,017 | 3/1985 | Gadd et al. ....................... 423/101 |
| 4,511,541 | 4/1985 | Bierman et al. .................... 423/100 |

FOREIGN PATENT DOCUMENTS

| 0023195 | 1/1981 | European Pat. Off. . |
| 3134847 | 3/1983 | Fed. Rep. of Germany . |
| 3434611 | 4/1986 | Fed. Rep. of Germany . |

*Primary Examiner*—Robert L. Stoll
*Attorney, Agent, or Firm*—Foley & Lardner, Schwartz, Jeffery, Schwaab, Mack, Blumenthal & Evans

[57] ABSTRACT

Disclosed is a process for the precipitation and separation of cadmium sulphide from the raffinates derived from phosphoric acid purification by treating the cadmium containing streams of the raffinates with a $H_2S$ containing solvent phase in a mixing-settling apparatus, by separating the raffinate phase from the cadmium sulphide containing solvent phase and by separating the precipitated cadmium sulphide from the solvent phase. By operating this process it is possible to remove cadmium in a simple manner from the raffinates since their inherent properties don't influence the precipitation and separation of cadmium sulphide.

13 Claims, No Drawings

PROCESS FOR THE PRECIPITATION AND SEPARATION OF CADMIUM SULPHIDE FROM THE RAFFINATES DERIVED FROM PHOSPHORIC ACID PURIFICATION

BACKGROUND OF THE INVENTION

The invention describes a process for the precipitation and separation of cadmium sulphide from the raffinates derived from the purification of phosphoric acid.

In the last few decades, a number of processes have become known for purification of wet-process phosphoric acid by treating it with solvents. Some of these proposals for purification processes have meanwhile been applied in industrial practice. Processes for purification of phosphoric acid have been successfully operated on a large industrial scale for years.

All these processes are characterised by the wet-process phosphoric acid being split up into two production streams: a pure acid stream and a raffinate stream. The latter contains not only a small amount of phosphoric acid but also the sum total of all companion substances from the wet acid and possibly other auxiliary substances which may have found their way into the process in the course of the purification operation. These could be alkaline or ammonium compounds. The cationic companion substances are present in the raffinates as phosphate, sulphate or fluoride salts in concentrated form with a low water content.

The raffinates are valuable by-products whose contents of phosphate and nutritional trace elements make them suitable for use as additives in the fertilizer industry.

The individual substances from the wet acid are enriched in the raffinate in accordance with $P_2O_5$ yield in the phosphoric acid pruification process. Filter acids produced from marine phosphate sediments have a small cadmium content in the range from 5 to 50 ppm. This depends on the species of the raw phosphate and is subject to wide fluctuation.

Of late, efforts have been undertaken to minimize the amount of cadmium being introduced into the soil by way of phosphate fertilizers. Although the amounts of cadmium deriving from the raffinates are relatively small, in enriched form they do constitute an important quality feature for the assessment of their suitability as a fertilizer component.

In the last few years a number of processes have become known which aim at reducing the cadmium content in the phosphate fertilizers. These processes can be divided into two groups according how they are applied:

In one group, the cadmium content is reduced in the raw phosphates.

In the other group of processes, the cadmium is separated from the acid.

None of these processes can be applied to the problem of removing the cadmium from the raffinates of the phosphoric acid purification processes, as the physical and chemical characteristics are comparable neither with those of a phosphoric acid nor with those of a raw phosphate. Hitherto, no proposal has been made known for a technical solution to the special problem of removing cadmium from the raffinates of the phosphoric acid purification process.

The raffinates from the phosphoric acid purification processes are highly complex salt mixtures composed of the dissolved and solid companion substances of the wet-process phosphoric acid. Depending on the phosphoric acid purification process, they have a greater or lesser content of free acid. Their degree of saturation lies between the 0.5 and 0.9-basic levels. Their $P_2O_5$ content ranges from 25 to 40 percent by weight.

The water content in raffinates ranges between 20 and 30 percent by weight. These are a mixture of a large number of salt pairs and therefore form a strongly oversaturated solution with a tendency toward crystallisation. The raffinates contain a certain amount of solids in the form of microcrystalline bodies embedded in the surrounding, highly viscous solution.

The viscosity of the raffinates usually lies in the range between 100 to 1000 mPas. Raffinates with a higher viscosity are also known. The specific gravity ranges from 1.5 to 1.7 kg/l.

Depending on the origin of the used raw phosphate to produce the wet acid and on the yield of the acid purification process, the cadmium content in the raffinates may range between 20 and 350 ppm.

The removal of cadmium from phosphoric acids by $H_2S$ precipitation is described in patent literature.

According to DE-OS No. 2422 902, it is possible to precipitate cadmium from more highly concentrated phosphoric acids with a $P_2O_5$ content of more than 45 percent by weight under pressure of up to 50 atm and with a residence time of up to 3 hours. The examples show that a residual value of 10% to 90% relative to the cadmium input value remains in the acid. The residual cadmium content in the acid depends on the $H_2S$ pressure and the exposure time. The sulphide precipitate is separated off by filtration immediately after pressure-gassing in the presence of the high $H_2S$ content. Following filtration, the $H_2S$ content is removed from the phosphoric acid by sophisticated technical measures.

The Japanese patent specification No. 75 75.115 also describes an $H_2S$ pressure-gassing process for removing cadmium from an acid with a $P_2O_5$ content of 28%. Here $H_2S$ is added in the form of a concentrated $Na_2S$ solution. The example produces an $H_2S$ concentration in the acid of 0.21 percent by weight, resulting in a pressure of 1.4 atm. The precipitated sulphides are filtered out of the acid containing $H_2S$ immediately after gassing.

The Japanese patent specification No. 78 75.196 describes a process for the simultaneous reduction of the $SO_4$ content and of the heavy metal content in a 70% phosphoric acid by treating it with calcium hydroxide in combination with an aqueous $Na_2S$ solution. This method entails a 25-fold $H_2S$ surplus calculated on the basis of the heavy metal content. The acid is filtered after a reaction time of 1 hour.

The Swedish patent application No. 7904 135-6 similarly describes a method for cleaning phosphoric acid of heavy metals by precipitation of sulphides. One part of the sulphuric acid is converted into gypsum by calcium hydroxide; the basicity of the free acid is raised by the addition of alkali. The precipitated sulphides are removed from the acid by filtration.

In all known sulphide precipitation processes the precipitated sulphides are removed from the treated phosphoric acid by filtration. It is known that the filtration of sulphide precipitates on an industrial scale poses great difficulties as the sulphide precipitates build up very dense coatings on the filter elements, which in turn results in very low filtration rates.

SUMMARY OF THE INVENTION

The process according to the invention for which this patent application is filed is also a sulphide precipitation process. However, in contrast to the known processes, the sulphides do not precipitate in the aqueous media containing heavy metals but in a solvent phase containing $H_2S$, this solvent phase not itself being miscible with the aqueous phase.

With the aid of the process for which this patent application is filed, cadmium can be removed from the raffinates derived from the phosphoric acid purification process in a simple manner since the inherent properties of the raffinates don't influence the precipitation and separation of the cadmium sulphide. The process according to the invention is distinguished by the cadmium containing streams of raffinates being treated with a $H_2S$ containing solvent phase in a closed mixing settling apparatus, by the raffinate phase being separated from the cadmium sulphide containing solvent phase and by the precipitated cadmium sulphide being separated from the solvent phase.

DETAILED DESCRIPTION OF PREFERRED EMBODIMENTS

Surprisingly it was discovered that when a raffinate containing cadmium is treated with a $H_2S$ containing, non-miscible solvent phase, precipitation of the sulphides doesn't take place in the raffinate, as was to have been expected according to the state of the art, but in the solvent phase.

If a cadmium containing raffinate phase is brought into contact with a $H_2S$ containing solvent phase by intensive agitation, the cadmium ions migrate from the raffinate phase into the solvent phase, where they are precipitated as sulphides. The precipitation reaction constantly upsets the distribution balance of the cadmium ions between the raffinate phase and the solvent phase. This leads to a practically quantitative removal of cadmium from the raffinate phase using only one reaction stage. For this reason, the process is carried out in a single-stage mixing-settling apparatus. A multi-stage countercurrent apparatus is not necessary.

In the mixing process, the precipitated sulphide particles are suspended in the solvent phase. When the reaction mixture is separated, first the raffinate phase precipitates forming a bottom phase and is separated from the solvent phase. In the separated and settled solvent phase, the precipitated sulphides then settle as bottoms by sedimentation and in this form are then separated from the solvent phase above.

It was also surprising that during operation of the process according to the invention no appreciable concentrations of $H_2S$ appear in the treated raffinates. The $H_2S$ content of the raffinates lies in the range from 0.001 to 0.003% and is therefore approximately 100 times lower than in the corresponding state-of-the-art $H_2S$ precipitation process. Subsequent treatment of the raffinate phase to reduce the $H_2S$ content is not necessary.

The process according to the invention is carried out with a solvent phase which must fulfill the following conditions:

It must not be miscible with the raffinate phase. It must possess solubility for $H_2S$ and it must not change the physical characteristics of the raffinate phase during the treatment.

Suitable organic solvents are organic compounds possessing up to 6 carbon atoms and at least one oxygen atom. The process according to the invention can be carried out with monovalent alcohols, with ketones such as methyl-isobutyl-ketone or with ethers such as diisopropyl-ether. Alcohols with up to 5 carbon atoms or their compounds have proved to be especially useful. As a further important component the solvent phase also contains aqueous phosphoric acid, which is in solubility balance with the raffinate phase and does not change the physical characteristics of the raffinate phase during the treatment.

Of particular advantage are solvent phases composed of the same combination of solvents as the solvent phase in the corresponding phosphoric acid purification process with produces the raffinate phase that is to be treated.

The $H_2S$ content of the solvent phase lies in the range from 0.1 to 2%. The best results are obtained with an $H_2S$ concentration between 0.1 and 0.5%.

The quantity ratio between the raffinate phase and the solvent phase is determined by the quantity of the sulphides to be precipitated. If the raffinate has a high cadmium content, it is necesssary to have a larger quantity of solvent phase to be able to suspend the precipitated sulphides in it. If the raffinate contains proportionally less cadmium, the necessary volume of solvent phase is correspondingly reduced. With a cadmium content of approximately 80 ppm in the raffinate a ratio of 1.0 parts by weight of raffinate phase to 0.2 parts by weight of solvent phase is sufficient to achieve a 95% reduction of the cadmium content. If the cadmium content in the raffinate remains the same but the quantity of solvent phase is reduced, this results in a deterioration of the cadmium reduction ratio. Increasing the amount of solvent phase has no adverse effects on the reduction ratio.

The agitation times for exhaustive precipitation of the cadmium sulphide lie in the range from approximately 5 to 30 minutes. The agitation times depend on the efficiency of the agitator and the viscosity of the raffinate.

Separating the phases presents no problem as their densities are very different and the solvents do not tend to emulsify.

The process according to the invention is usually carried out in the temperature range from 20°-40° C. Tests have shown that at operating temperatures around 0° C. the cadmium reduction ratio decreases by approximately relative 15% as a result of the slowed migration velocity of the cadmium ions in the raffinate due to the increase in viscosity.

The process according to the invention is usually operated as a single-stage mixing and separating process. This can be carried out either in batches or as a continuous process. Batch operation is the preferred method since all mixing and separating operations are carried out in one reactor and the technical effort is correspondingly small.

The process according to the invention is executed on an industrial scale as follows, however this description must not in any way limit the process according to the invention to this particular embodiment.

A weighed quantity of a cadmium containing raffinate and deriving from the phosphoric acid purification process is taken from a supply tank and placed in a closed stirring reactor together with a weighed quantity of a $H_2S$ containing solvent phase. The two compounds are then intensively mixed for approximately 20 minutes. After the agitator stops, the mixture is left in the reactor for approximately 30 minutes and then drawn off via the bottom drain-off and moved on for further processing. After a subsequent sedimentation time of approximately 30 minutes, the sulphidic sediment is separated from the solvent phase via the bottom drain-off, dried and taken away for disposal. Then the cadmium-free solvent phase is drained off into a receiver to be re-used in a subsequent precipitation process. The separating operations are monitored in the usual manner by measuring equipment.

The following table shows the test results as examples.

| | Raffinate phase input | | | | Solvent Phase input | | | | Raffinate phase output | | |
|---|---|---|---|---|---|---|---|---|---|---|---|
| Example | Quantity kg | Viscosity mPas (20° C.) | Cadmium content ppm | Temp. °C. | Quantity kg | Solvent type | $P_2O_5$ % | $H_2S$ % | Cadmium content ppm | $H_2S$ ppm | Reduction % of input |
| 1 | 1005 | 320 | 72 | 28 | 202 | IPA | 16.2 | 0.1 | 4 | 23 | 94.4 |
| 2 | 1021 | 684 | 84 | 20 | 165 | IPA | 15.2 | 0.2 | 5 | 11 | 94.0 |
| 3 | 985 | 410 | 69 | 35 | 95 | IPA | 16.7 | 0.3 | 6 | 29 | 91.3 |
| 4 | 1010 | 105 | 57 | 35 | 253 | n.BuOH | 13.4 | 0.2 | 2 | 13 | 96.5 |
| 5 | 1003 | 850 | 76 | 38 | 201 | n.BuOH | 16.9 | 0.3 | 3 | 18 | 96.1 |
| 6 | 1005 | 507 | 81 | 20 | 152 | i.BuOH | 17.5 | 0.2 | 4 | 18 | 95.1 |

IPA = isopropanol
n.BuOH = n-butanol
i.BuOH = i-butanol

What is claimed is:

1. A process for the precipitation and separation of cadmium sulphide from a raffinate derived from purification of phosphoric acid, comprising the steps of:
treating an aqueous cadmium containing raffinate phase with a $H_2S$ containing solvent phase under agitation conditions sufficient to produce a cadmium sulphide precipitate in the solvent phase; separating the raffinate phase from the cadmium sulphide containing solvent phase; and separating the precipitated cadmium sulphide from the solvent phase, wherein said $H_2S$ containing solvent phase is miscible to partly miscible with water and phosphoric acid but substantially immiscible with the raffinate phase, and comprises an organic compound having up to 6 carbon atoms and at least one oxygen atom.

2. A process according to claim 1, wherein the solvent phase contains at least one alcohol having up to 5 carbon atoms.

3. A process according to claim 1, wherein the precipitated sulphide is removed from the solvent phase containing cadmium sulphide by decantation, centrifugation or filtration.

4. A process according to claim 1, wherein said treating is carried out in a closed mixing/settling apparatus.

5. A process according to claim 1, wherein the process is carried out as a batch process.

6. A process according to claim 1, wherein the process is carried out as a continuous process.

7. A process according to claim 1, wherein said treating is carried out for a period of from about 5 to 30 minutes.

8. A process according to claim 1, wherein the ratio of raffinate phase to solvent phase is not greater than about 1:0.2.

9. A process according to claim 1, wherein said solvent phase contains $H_2S$ in an amount of from about 0.2 to 2% by weight.

10. A process according to claim 1, wherein said solvent phase further comprises aqueous phosphoric acid.

11. A process according to claim 10, wherein said phosphoric acid in the solvent phase is in solubility balance with phosphoric acid in the raffinate phase.

12. A process according to claim 1, wherein the process is carried out at a temperature of from about 20° to 40° C.

13. A process according to claim 1, wherein said raffinate is derived from purification of phosphoric acid, which purification comprises a step of extraction with an extraction-solvent phase, wherein said extraction-solvent phase comprises a combination of solvents identical to that in said $H_2S$ containing solvent phase.

* * * * *